United States Patent
Li (10) Patent No.: US 9,935,462 B2
(45) Date of Patent: Apr. 3, 2018

(54) SYSTEM AND METHOD FOR CONTROLLING A CONVERTER CIRCUIT

(71) Applicant: Macau University of Science and Technology, Taipa, Macau (CN)

(72) Inventor: Xiaodong Li, Taipa (CN)

(73) Assignee: MACAU UNIVERSITY OF SCIENCE AND TECHNOLOGY, Taipa (MO)

(*) Notice: Subject to any disclaimer, the term of this patent is extended or adjusted under 35 U.S.C. 154(b) by 0 days.

(21) Appl. No.: 15/007,486

(22) Filed: Jan. 27, 2016

(65) Prior Publication Data
US 2017/0214321 A1    Jul. 27, 2017

(51) Int. Cl.
H02J 3/38     (2006.01)
H02M 3/335    (2006.01)

(52) U.S. Cl.
CPC ........... H02J 3/38 (2013.01); H02M 3/33584 (2013.01)

(58) Field of Classification Search
CPC ......... H02M 3/33507; H02M 3/33546; H02M 3/33584; H02M 2007/4815; H02M 3/33569; H02M 7/5387
See application file for complete search history.

(56) References Cited

U.S. PATENT DOCUMENTS

| 7,800,331 B2 * | 9/2010 | Chakrabarti | H02P 27/08 318/105 |
| 7,825,539 B2 * | 11/2010 | Ye | G06F 1/263 307/44 |

* cited by examiner

*Primary Examiner* — Henry Lee, III
(74) *Attorney, Agent, or Firm* — Renner Kenner Greive Bobak Taylor & Weber (57) ABSTRACT

A method for controlling an operation of a converter circuit adapted to regulate power transfer between a first voltage source and a second voltage source includes detecting a first voltage level of the first voltage source and a second voltage level of the second voltage source; calculating a power value based on the detected first voltage level and the detected second voltage level; comparing the calculated power value with a reference power value; and determining switching time of one or more switches in the converter circuit based on a compared result so as to regulate power transfer between the first voltage source and the second voltage source.

18 Claims, 4 Drawing Sheets

SYSTEM AND METHOD FOR CONTROLLING A CONVERTER CIRCUIT

TECHNICAL FIELD

The present invention relates to a system and method for controlling a converter circuit, and particularly, although not exclusively, to a method for controlling a high-frequency isolated bidirectional dual-bridge resonant dc/dc converter for providing efficient power flow between two voltage sources.

BACKGROUND

Figure 1:
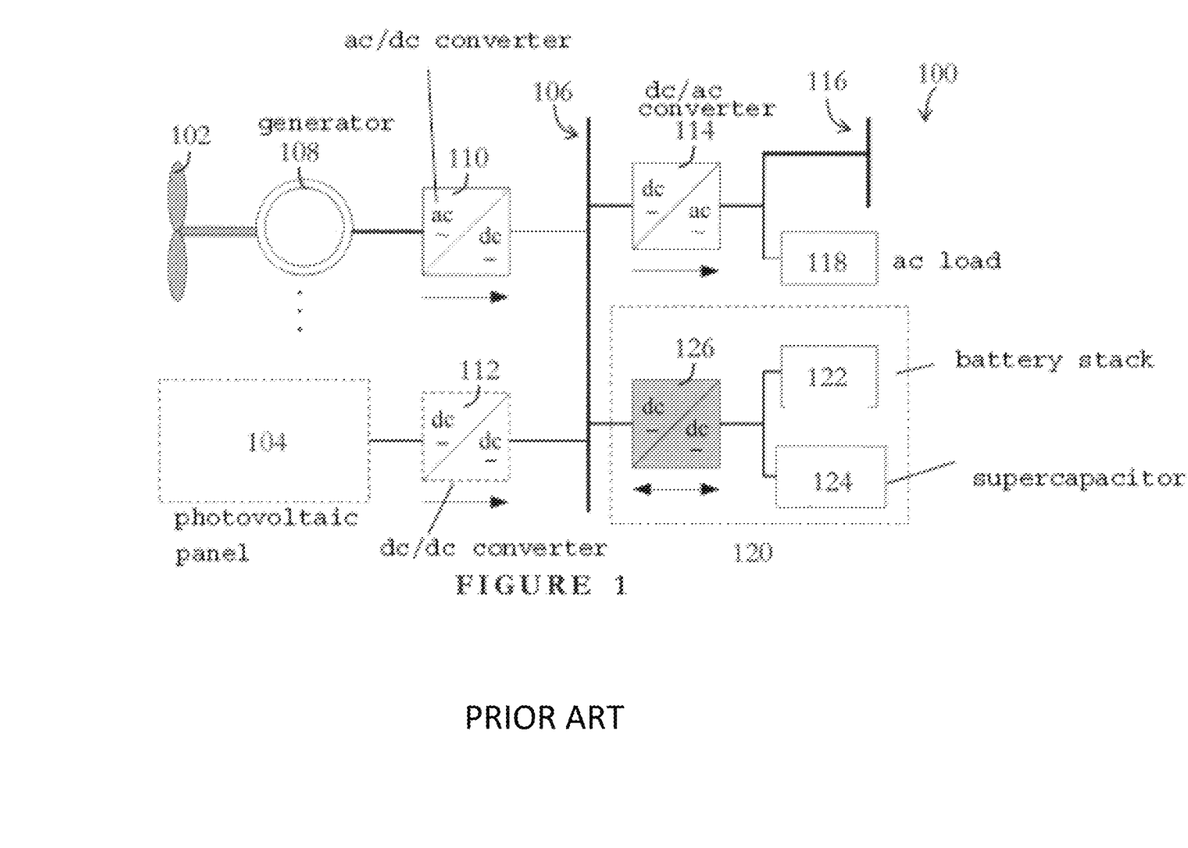
FIG. 1 is a schematic diagram of an exemplary renewable energy system.

Bidirectional dc/dc converters are gaining more attentions due to the recent rapid development in renewable energy harvesting technologies. FIG. 1 shows an exemplary renewable energy system 100. In FIG. 1, the renewable energy system 100 includes different components for harvesting renewable energy. For example, the system includes a wind turbine 102 for harvesting winding energy and a photovoltaic panel 104 for harvesting light energy. In general, these renewable energy has to be converted to a relatively stable dc link voltage before it can be further converted to different dc or ac voltages for use. In the present example, the wind turbine 102 is connected to a dc link 106 through a Permanent Magnet synchronous Generator 108 and an ac-dc converter 110, whilst the photovoltaic panel 104 is connected to the dc link 106 via a dc-dc converter 112. The energy provided by these sources, collected at the dc link 106, will either be used or stored. For example, the energy may be provided through a dc-ac converter 114 to a grid 116 or ac load 118 for use. The energy may also be stored in an energy storage system 120, which includes, for example, a battery stack 122 and a super-capacitor 124, through a dc-dc converter 126. Ideally, the dc-dc converter 126 of the energy storage system 120 allows bi-directional energy transfer between the dc link 106 and the battery stack 122/super-capacitor 124, and can process bidirectional power flow efficiently even under wide variations in power level and/or voltage levels on both sides.

SUMMARY OF THE INVENTION

In accordance with a first aspect of the present invention, there is provided a method for controlling an operation of a converter circuit adapted to regulate power transfer between a first voltage source and a second voltage source, the method comprising the steps of: detecting a first voltage level of the first voltage source and a second voltage level of the second voltage source; calculating a power value based on the detected first voltage level and the detected second voltage level; comparing the calculated power value with a reference power value; and determining switching time of one or more switches in the converter circuit based on a compared result so as to regulate power transfer between the first voltage source and the second voltage source. The first voltage source may be at a higher voltage than the second voltage source.

In one embodiment of the first aspect, the method further comprises the step of: generating gating signals to be provided to the one or more switches based on the determined switching time.

In one embodiment of the first aspect, the method further comprises the step of: providing the gating signals to the one or more switches so as to control switching on and off thereof.

In one embodiment of the first aspect, the method further comprises the step of: controlling the one or more switches to have a substantially identical switching period. The one or more switches may or may not be switched at the same time.

In one embodiment of the first aspect, the step of detecting the first voltage level and the second voltage level comprises: sampling the first voltage level and/or sampling the second voltage level. Alternatively, the step of detecting the first voltage level and the second voltage level comprises: continuously monitoring the first voltage level and/or continuously monitoring the second voltage level.

In one embodiment of the first aspect, the power value is calculated according to:

$$P^* = P_{max} \cdot \frac{V_L^2}{\sqrt{V_L^4 - V_{Lmax}^4 + V_{Lmax}^2 V_{Hmin}^2}}$$

where $P^*$ is the power value to be calculated, $P_{max}$ is an upper limit of the power value, $V_L$ is the detected second voltage level, $V_{Lmax}$ is an upper limit of the second voltage level, and $V_{Hmin}$ is a lower limit of the first voltage level.

In one embodiment of the first aspect, the converter circuit comprises: a first switching circuit in the form of a bridge circuit, the first switching circuit having a first pair of switches and a second pair of switches connected in parallel with each other; a second switching circuit in the form of a bridge circuit, the second switching circuit having a third pair of switches and a fourth pair of switches connected in parallel with each other; and an inductive component coupling the first switching circuit with the second switching circuit; and wherein the method comprises: controlling the first pair of switches, the second pair of switches, the third pair of switches, the fourth pair of switches so that they all have a substantially identical switching period.

In one embodiment of the first aspect, the step of determining switching time comprises: determining a first duration from a switch-on time of one of the second pair of switches to a switch-on time of one of the first pair of switches; and determining a second duration between the switch-on time of the one of the first pair of switches and a switch-on time of one of the fourth pair of switches.

In one embodiment of the first aspect, if the calculated power value is smaller than the reference power value, the first duration and the second duration are determined by:

$$T_{d1} = \frac{1}{\pi} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2} T_p \cos^{-1}\left[\frac{V_L^2}{\sqrt{V_L^4 - V_{Lmax}^4 + V_{Lmax}^2 V_{Hmin}^2}}\right] -$$

$$\frac{\pi}{2} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

In one embodiment of the first aspect, if the calculated power value is larger than the reference power value, the first duration and the second duration are determined by:

$$T_{d1} = \frac{1}{\pi} T_p \cos^{-1}\left[\frac{V_L}{V_H}\right]$$

$$T_{d2} = \frac{\pi}{2} T_p \sin^{-1}\left[\frac{P_{com} V_{Lmax}\left(\sqrt{V_{Hmin}^2 - V_{Lmax}^2}\right)}{P_{max}} \cdot V_L^2\right] - \frac{\pi}{2} T_p \cos^{-1}\left[\frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

In one embodiment of the first aspect, the method further comprises one or more (e.g., all) of the steps of: switching on and off the first pair of switches complementarily such that each of the first pair of switches has a duty cycle of about 50% with a dead time therebetween; switching on and off the second pair of switches complementarily such that each of the second pair of switches has a duty cycle of about 50% with a dead time therebetween; switching on and off the third pair of switches complementarily such that each of the third pair of switches has a duty cycle of about 50% with a dead time therebetween; and switching on and off the fourth pair of switches complementarily such that each of the fourth pair of switches has a duty cycle of about 50% with a dead time therebetween. The expression "about" 50% is used to take into account the deadline between the switching on and off of the switches.

In one embodiment of the first aspect, the method further comprises one or more (i.e., both) of the steps of: switching on and off one of the third pair of switches and one of the fourth pair of switches synchronously; and switching on and off another one of the third pair of switches and another one of the fourth pair of switches synchronously.

In one embodiment of the first aspect, the reference power value is predetermined.

In one embodiment of the first aspect, the reference power value is dynamically adjustable, and the method further comprises the step of: receiving the reference power value before the step of comparing the calculated power value with the reference power value.

In one embodiment of the first aspect, the converter circuit is controlled so as to regulate bi-directional power flow between the first voltage source and the second voltage source.

In accordance with a second aspect of the present invention, there is provided a controller arranged to control an operation of a converter circuit adapted to regulate power transfer between a first voltage source and a second voltage source, the controller being arranged to: detect a first voltage level of the first voltage source and a second voltage level of the second voltage source; calculate a power value based on the detected first voltage level and the detected second voltage level; compare the calculated power value with a reference power value; and determine switching time of one or more switches in the converter circuit based on a compared result so as to regulate power transfer between the first voltage source and the second voltage source. The first voltage source may be at a higher voltage than the second voltage source.

In one embodiment of the second aspect, the controller is further arranged to: generate gating signals to be provided to the one or more switches based on the determined switching time.

In one embodiment of the second aspect, the controller is further arranged to: provide the gating signals to the one or more switches so as to control switching on and off thereof.

In one embodiment of the second aspect, the gating signals are PWM signals.

In one embodiment of the second aspect, the controller is further arranged to control the one or more switches so that the one or more switches have a substantially identical switching period.

In one embodiment of the second aspect, the controller is arranged to detect the first voltage level and the second voltage level by: sampling the first voltage level and/or the second voltage level using one or more voltage sensors in connection with the controller. Alternatively, the controller is arranged to detect the first voltage level and the second voltage level by: continuously monitoring the first voltage level and/or the second voltage level using one or more voltage sensors in connection with the controller.

In one embodiment of the second aspect, the controller is arranged to calculate the power value according to:

$$P^* = P_{max} \cdot \frac{V_L^2}{\sqrt{V_L^4 - V_{Lmax}^4 + V_{Lmax}^2 V_{Hmin}^2}}$$

where $P^*$ is the power value to be calculated, $P_{max}$ is an upper limit of the power value, $V_L$ is the detected second voltage level, $V_{Lmax}$ is an upper limit of the second voltage level, and $V_{Hmin}$ is a lower limit of the first voltage level.

In one embodiment of the second aspect, the converter circuit comprises: a first switching circuit in the form of a bridge circuit, the first switching circuit having a first pair of switches and a second pair of switches connected in parallel with each other; a second switching circuit in the form of a bridge circuit, the second switching circuit having a third pair of switches and a fourth pair of switches connected in parallel with each other; and an inductive component coupling the first switching circuit with the second switching circuit; and the controller is arranged to control the first pair of switches, the second pair of switches, the third pair of switches, and the fourth pair of switches so that they all have a substantially identical switching period.

In one embodiment of the second aspect, the switching time determined by the controller comprises: a first duration from a switch-on time of one of the second pair of switches to a switch-on time of one of the first pair of switches; and a second duration between the switch-on time of the one of the first pair of switches and a switch-on time of one of the fourth pair of switches.

In one embodiment of the second aspect, if the calculated power value is smaller than the reference power value, the controller is arranged to determine the first duration and the second duration by:

$$T_{d1} = \frac{1}{\pi} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2} T_p \cos^{-1}\left[\frac{V_L^2}{\sqrt{V_L^4 - V_{Lmax}^4 + V_{Lmax}^2 V_{Hmin}^2}}\right] -$$

$$\frac{\pi}{2} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

In one embodiment of the second aspect, if the calculated power value is larger than the reference power value, the controller is arranged to determine the first duration and the second duration by:

$$T_{d1} = \frac{1}{\pi} T_p \cos^{-1}\left[\frac{V_L}{V_H}\right]$$

$$T_{d2} = \frac{\pi}{2} T_p \sin^{-1}\left[\frac{P_{com} V_{Lmax}\left(\sqrt{V_{Hmin}^2 - V_{Lmax}^2}\right)}{P_{max}} \cdot V_L^2\right] - \frac{\pi}{2} T_p \cos^{-1}\left[\frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

In one embodiment of the second aspect, the controller is further arranged to perform one or more (e.g., all) of the following: switch on and off the first pair of switches complementarily such that each of the first pair of switches has a duty cycle of about 50% with a dead time therebetween; switch on and off the second pair of switches complementarily such that each of the second pair of switches has a duty cycle of about 50% with a dead time therebetween; switch on and off the third pair of switches complementarily such that each of the third pair of switches has a duty cycle of about 50% with a dead time therebetween; and switch on and off the fourth pair of switches complementarily such that each of the fourth pair of switches has a duty cycle of about 50% with a dead time therebetween. The expression "about" 50% is used to take into account the deadline between the switching on and off of the switches.

In one embodiment of the second aspect, the controller is further arranged to perform one or more (i.e., both) of the following: switch on and off one of the third pair of switches and one of the fourth pair of switches synchronously; and switch on and off another one of the third pair of switches and another one of the fourth pair of switches synchronously.

In one embodiment of the second aspect, the reference power value is predetermined.

In one embodiment of the second aspect, the reference power value is dynamically adjustable, and the controller is further arranged to receive the reference power value before comparing the calculated power value with the reference power value.

In one embodiment of the second aspect, the controller is arranged to control the converter circuit to regulate bi-directional power flow between the first voltage source and the second voltage source.

In accordance with a third aspect of the present invention, there is provided a converter circuit adapted to be arranged between a first voltage source and a second voltage source to regulate power transfer therebetween, the converter circuit comprises: a first switching circuit in the form of a bridge circuit, the first switching circuit having a first pair of switches and a second pair of switches connected in parallel with each other; a second switching circuit in the form of a bridge circuit, the second switching circuit having a third pair of switches and a fourth pair of switches connected in parallel with each other; an inductive component coupling the first switching circuit with the second switching circuit; the converter circuit further comprises a controller arranged to: detect a first voltage level of the first voltage source and a second voltage level of the second voltage source; calculate a power value based on the detected first voltage level and the detected second voltage level; compare the calculated power value with a reference power value; and determine switching time of one or more switches in the first switching circuit and switching time of one or more switches in the second switching circuit based on a compared result so as to regulate power transfer between the first voltage source and the second voltage source. The first voltage source may be at a higher voltage than the second voltage source.

In one embodiment of the third aspect, the controller is further arranged to: generate gating signals to be provided to the first pair of switches, the second pair of switches, the third pair of switches and the fourth pair of switches based on the determined switching time; and provide the gating signals to the first pair of switches, the second pair of switches, the third pair of switches and the fourth pair of switches so as to control switching on and off thereof.

In one embodiment of the third aspect, the controller is arranged to control the first pair of switches, the second pair of switches, the third pair of switches, and the fourth pair of switches such that they all have a substantially identical switching period.

In one embodiment of the third aspect, the controller is arranged to calculate the power value according to:

$$P^* = P_{max} \cdot \frac{V_L^2}{\sqrt{V_L^4 - V_{Lmax}^4 + V_{Lmax}^2 V_{Hmin}^2}}$$

where $P^*$ is the power value to be calculated, $P_{max}$ is an upper limit of the power value, $V_L$ is the detected second voltage level, $V_{Lmax}$ is an upper limit of the second voltage level, and $V_{Hmin}$ is a lower limit of the first voltage level.

In one embodiment of the third aspect, the switching time determined by the controller comprises: a first duration from a switch-on time of one of the second pair of switches to a switch-on time of one of the first pair of switches; and a second duration between the switch-on time of the one of the first pair of switches and a switch-on time of one of the fourth pair of switches.

In one embodiment of the third aspect, if the calculated power value is smaller than the reference power value, the controller is arranged to determine the first duration and the second duration by:

$$T_{d1} = \frac{1}{\pi} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2} T_p \cos^{-1}\left[\frac{V_L^2}{\sqrt{V_L^4 - V_{Lmax}^4 + V_{Lmax}^2 V_{Hmin}^2}}\right] -$$

$$\frac{\pi}{2} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

and if the calculated power value is larger than the reference power value, the controller is arranged to determine the first duration and the second duration by:

$$T_{d1} = \frac{1}{\pi}T_p \cos^{-1}\left[\frac{V_L}{V_H}\right]$$

$$T_{d2} = \frac{\pi}{2}T_p \sin^{-1}\left[\frac{P_{com}V_{Lmax}\left(\sqrt{V_{Hmin}^2 - V_{Lmax}^2}\right)}{P_{max}} \cdot V_L^2\right] - \frac{\pi}{2}T_p \cos^{-1}\left[\frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

In one embodiment of the third aspect, the controller is further arranged to perform one or more (e.g., all) of the following: switch on and off the first pair of switches complementarily such that each of the first pair of switches has a duty cycle of about 50% with a dead time therebetween; switch on and off the second pair of switches complementarily such that each of the second pair of switches has a duty cycle of about 50% with a dead time therebetween; switch on and off the third pair of switches complementarily such that each of the third pair of switches has a duty cycle of about 50% with a dead time therebetween; switch on and off the fourth pair of switches complementarily such that each of the fourth pair of switches has a duty cycle of about 50% with a dead time therebetween; switch on and off one of the third pair of switches and one of the fourth pair of switches synchronously; and switch on and off another one of the third pair of switches and another one of the fourth pair of switches synchronously. The expression "about" 50% is used to take into account the deadline between the switching on and off of the switches.

In one embodiment of the third aspect, the inductive component comprises a transformer with a primary winding and a secondary winding, the primary winding being connected with the first switching circuit and the secondary winding being connected with the second switching circuit.

In one embodiment of the third aspect, the converted circuit further comprises a resonance circuit electrically connected between the first switching circuit and the inductive component.

In one embodiment of the third aspect, a resonance frequency of the resonance circuit is substantially identical to a switching frequency (i.e., reciprocal of the switching period).

In one embodiment of the third aspect, the resonance circuit comprises a series connected capacitor and inductor.

In one embodiment of the third aspect, the reference power value is predetermined.

In one embodiment of the third aspect, the reference power value is dynamically adjustable, and the controller is further arranged to receive the reference power value before comparing the calculated power value with the reference power value.

In one embodiment of the third aspect, each of the switches of the first pair of switches, the second pair of switches, the third pair of switches, and the fourth pair of switches comprises a semiconductor switch. In one example, each of the semiconductor switch is a MOSFET with a body/bypass diode.

In one embodiment of the third aspect, the converter circuit is arranged to regulate bi-directional power flow between the first voltage source and the second voltage source.

In one embodiment of the third aspect, a first filter circuit is electrically connected across the first voltage source; and/or a second filter circuit is electrically connected across the second voltage source. The first filter circuit may be a capacitor connected across the first voltage source. The second filter circuit may be a capacitor connected across the second voltage source.

In accordance with a fourth aspect of the present invention, there is provided a non-transient computer readable medium for storing computer instructions that, when executed by at least one processor, causes at least one processor to perform a method for controlling an operation of a converter circuit adapted to regulate power transfer between a first voltage source and a second voltage source, the method comprising the steps of: detecting a first voltage level of the first voltage source and a second voltage level of the second voltage source; calculating a power value based on the detected first voltage level and the detected second voltage level; comparing the calculated power value with a reference power value; and determining switching time of one or more switches in the converter circuit based on a compared result so as to regulate power transfer between the first voltage source and the second voltage source.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 2:
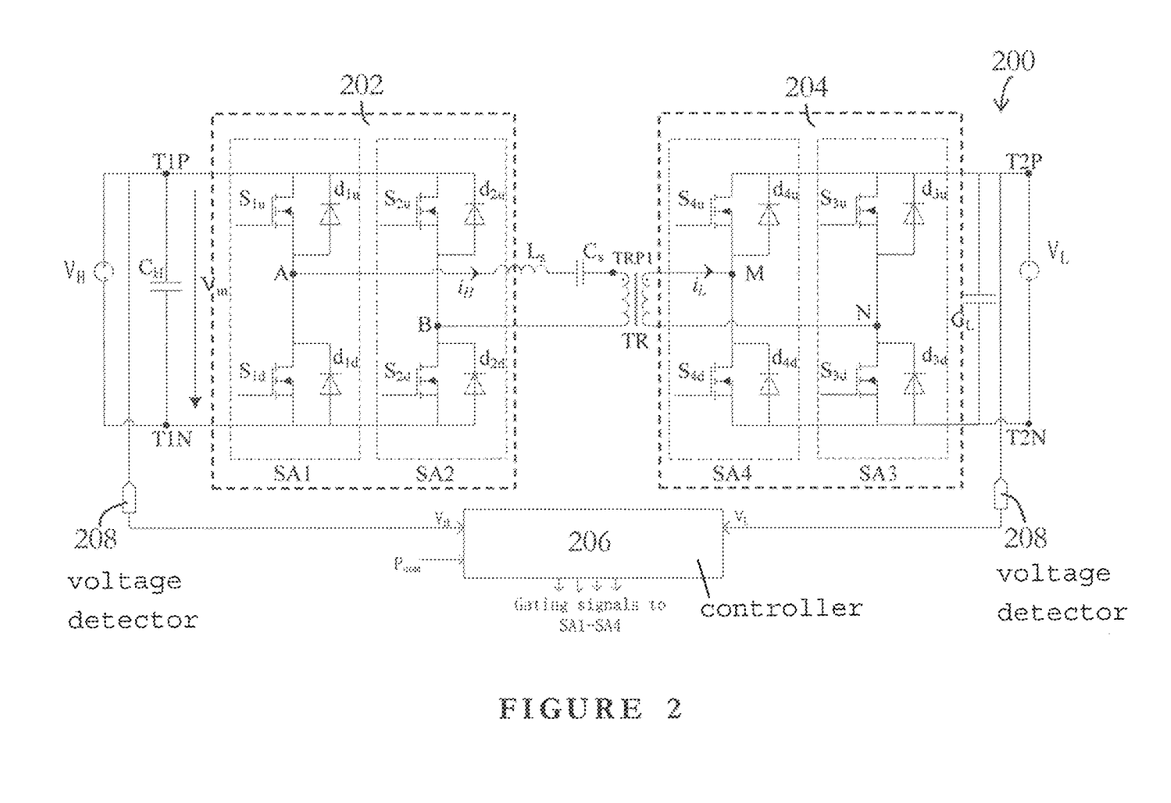
FIG. 2 is a circuit diagram of a converter circuit in accordance with one embodiment of the present invention.

Referring now to FIG. 2, there is provided a converter circuit 200 in accordance with one embodiment of the present invention. In the present embodiment, the converter circuit 200 is a high frequency isolated dual-bridge resonant dc/dc converter circuit. The circuit 200 is arranged between a first voltage source $V_H$ and a second voltage source $V_L$ for regulating power transfer between them. Preferably, the first and second voltage sources $V_H$ and $V_L$ are both DC voltage sources, and the circuit 200 is operable to regulate bi-directional power flow between the first and second voltage sources $V_H$ and $V_L$. In a preferred embodiment, the first voltage source $V_H$ is at a higher voltage compared with that of the second voltage source $V_L$. Also, the first and second voltage sources $V_H$ and $V_L$ may have a large voltage variation range. A first filter circuit may be electrically connected across the first voltage source, and a second filter circuit may be electrically connected across the second voltage source. In the present embodiment, the first filter circuit is a low pass filter formed by a capacitor $C_H$ connected across nodes T1P and T1N, and the second filter circuit is a low pass filter formed by a capacitor $C_L$ connected across nodes T2P and T2N. Preferably, nodes T1P and T2P are at a higher potential compared to that of nodes T1N and T2N respectively.

As shown in FIG. 2, the converter circuit 200 includes a first switching circuit 202 and a second switching circuit 204 both in the form of a bridge circuit. The first switching circuit 202 includes a first pair of switches SA1 and a second pair of switches SA2 connected in parallel with each other, across nodes T1P and T1N. The first pair of switches SA1 may include a first switch $s_{1u}$ and a second switch $s_{1d}$ connected in series. A first switch node A may be defined between the first switch $s_{1u}$ and the second switch $s_{1d}$. The second pair of switches SA2 may include a third switch $s_{2u}$ and a fourth switch $s_{2d}$ connected in series. A second switch node B may be defined between the third switch $s_{2u}$ and the fourth switch $s_{2d}$. The second switching circuit 204 includes a third pair of switches SA3 and a fourth pair of switches SA4 connected in parallel with each other, across nodes T2P and T2N. The third pair of switches SA3 may include a fifth switch $s_{3u}$ and a sixth switch $s_{3d}$ connected in series. A third switch node N may be defined between the fifth switch $s_{3u}$ and the sixth switch $s_{3d}$. The fourth pair of switches SA4 may include a seventh switch $s_{4u}$ and an eighth switch $s_{4d}$ connected in series. A fourth switch node M may be defined between the seventh switch $s_{4u}$ and the eighth switch $s_{4d}$. In a preferred embodiment, the switches $s_{1u}$, $s_{1d}$, $s_{2u}$, $s_{2d}$, $s_{3u}$, $s_{3d}$, $s_{4u}$, $s_{4d}$ are semiconductor switches which may be, for example, a MOSFET with a body/bypass diode $d_{1u}$, $d_{1d}$, $d_{2u}$, $d_{2d}$, $d_{3u}$, $d_{3d}$, $d_{4u}$, $d_{4d}$. The switches $s_{1u}$, $s_{1d}$, $s_{2u}$, $s_{2d}$, $s_{3u}$, $s_{3d}$, $s_{4u}$, $s_{4d}$ in the present embodiment may have a substantially identical switching period $T_p$, although they need not be switched on and/or off at the same time.

The converter circuit 200 further includes an inductive component connected between the first switching circuit 202 and the second switching circuit 204 for electrically coupling the two. In the present embodiment, the inductive component is a transformer TR with a primary winding connected in series between the first switch node A and the second switch node B of the first switching circuit 202, and a secondary winding connected in series between the third switch node N and the fourth switch node M of the second switching circuit 204. The transformer TR is operable to provide galvanic isolation between the first and second switching circuits 202 and 204. The turn ratio of the transformer TR can be designed to meet the requirements of different converter voltage ratios. A resonance circuit (resonant tank) may be electrically connected between the first switching circuit 202 and the inductive component. In the present example, the resonance circuit includes a series connected capacitor $C_s$ and inductor $L_s$ that are connected between the first switch node A and the primary winding. A resonance frequency of the resonance circuit is preferably substantially identical to a switching frequency (i.e., reciprocal of the switching period, or $1/T_p$) of the switches $s_{1u}$, $s_{1d}$, $s_{2u}$, $s_{2d}$, $s_{3u}$, $s_{3d}$, $s_{4u}$, $s_{4d}$. In the present example, the resonance frequency $f_r$ of the resonance circuit is given by:

$$f_r = \frac{1}{2\pi} \cdot \frac{1}{\sqrt{L_s C_s}}$$

In the present invention, the circuit components such as the capacitor $C_s$, the inductor $L_s$ and the turn ratio of the transformer TR is designed to operate at maximum power and maximum voltage gain, so as to allow a narrow range of voltage at the first voltage source $V_H$ and a wide range of voltage at the second voltage source $V_L$. A maximum voltage gain ensures that the voltage between the third node N and the fourth node M of the second switching circuit 204 is in phase with the transformer current $i_L$ at maximum power.

FIG. 2 also shows a controller 206 of the converter circuit 200. In one example, the controller 206 is a microcontroller. The controller 206 is arranged to control an operation of the converter circuit 200, and particularly the operation of the switches $s_{1u}$, $s_{1d}$, $s_{2u}$, $s_{2d}$, $s_{3u}$, $s_{3d}$, $s_{4u}$, $s_{4d}$, so as to regulate bi-directional power transfer between the first voltage source $V_H$ and the second voltage source $V_L$. In the present embodiment, the controller 206 is coupled with voltage detectors 208 connected to nodes T1P and T2P for detecting a voltage level of the first voltage source $V_H$ and a voltage level of the second voltage source $V_L$. The voltage detectors 208 may perform voltage detection by sampling the voltage value of the first and second voltage sources $V_H$ and $V_L$ at regular or random time intervals. Alternatively, the voltage detectors 208 may continuously monitor the voltage levels of the first and second voltage sources $V_H$ and $V_L$.

In the present invention, the controller 206 is operable to calculate a power value based on the detected first voltage level and the detected second voltage level, and to compare the calculated power value with a reference power value. The reference power value may be predetermined, or may be dynamically adjustable. In one embodiment, the controller 206 is operable to receive a reference power value from, for example, an operator operating the controller. The controller 206 is also operable to determine a switching time (switch-on time or switch-off time) of one or more of the switches $s_{1u}$, $s_{1d}$, $s_{2u}$, $s_{2d}$, $s_{3u}$, $s_{3d}$, $s_{4u}$, $s_{4d}$ in the converter circuit 200 based on a compared result. Based on the determined switching time, the controller 206 may then generate and provide gating signals to the one or more switches $s_{1u}$, $s_{1d}$, $s_{2u}$, $s_{2d}$, $s_{3u}$, $s_{3d}$, $s_{4u}$, $s_{4d}$ to control their operation. The gating signals may be PWM signals. In the present example, the controller 206 is preferably connected with the gate terminal of the MOSFET switches $s_{1u}$, $s_{1d}$, $s_{2u}$, $s_{2d}$, $s_{3u}$, $s_{3d}$, $s_{4u}$, $s_{4d}$.

In the present embodiment, the controller 206 is arranged control the switches $s_{1u}$, $s_{1d}$, $s_{2u}$, $s_{2d}$, $s_{3u}$, $s_{3d}$, $s_{4u}$, $s_{4d}$ such that all of them have a substantially identical switching period $T_p$. The switching period $T_p$, which is preferably fixed in the present invention, may be defined as a duration between successive switch-on times of the first switch $s_{1u}$. Preferably, the controller 206 switches on and off the first pair of switches SA1 complementarily (switches on the first switch $s_{1u}$ and switches off the second switch $s_{1d}$ at the same time) such that each of the first switch $s_{1u}$ and the second switch $s_{1d}$ has a duty cycle of about 50% with a dead time therebetween. Preferably, the controller 206 also switches on and off each of the second pair of switches SA2, the third pair of switches SA3, and/or the fourth pair of switches SA4 complementarily such that these switches $s_{2u}$, $s_{2d}$, $s_{3u}$, $s_{3d}$, $s_{4u}$, $s_{4d}$ have a respective duty cycle of about 50% with a dead time therebetween. In a preferred embodiment, the controller 206 also switches on and off one of the third pair of switches SA3 (e.g., the sixth switch $s_{3d}$) and one of the fourth pair of switches SA4 (e.g., the seventh switch $s_{4u}$) synchronously, and switches on and off another one of the third pair of switches SA3 (e.g., the fifth switch $s_{3u}$) and another one of the fourth pair of switches SA4 (e.g., the eighth switch $s_{4d}$) synchronously. The controller 206 in the present embodiment can also determine a first duration $T_{d1}$ between a switch-on time of one of the second pair of switches SA2 (e.g. the fourth switch $S_{2d}$) and a switch-on time of one of the first pair of switches SA1 (e.g., the first switch $S_{1u}$); and a second duration $T_{d2}$ between the switch-on time of the one of the first pair of switches SA1 (e.g., the first switch $S_{1u}$) and a switch-on time of one of the fourth pair of switches SA4 (e.g., the seventh switch $S_{4u}$), based on one or more predetermined equations or relationships. Preferably, the first duration $T_{d1}$ is positive and is between 0 to $T_p/2$. The second duration $T_{d2}$ may be positive or negative.

Figure 3:
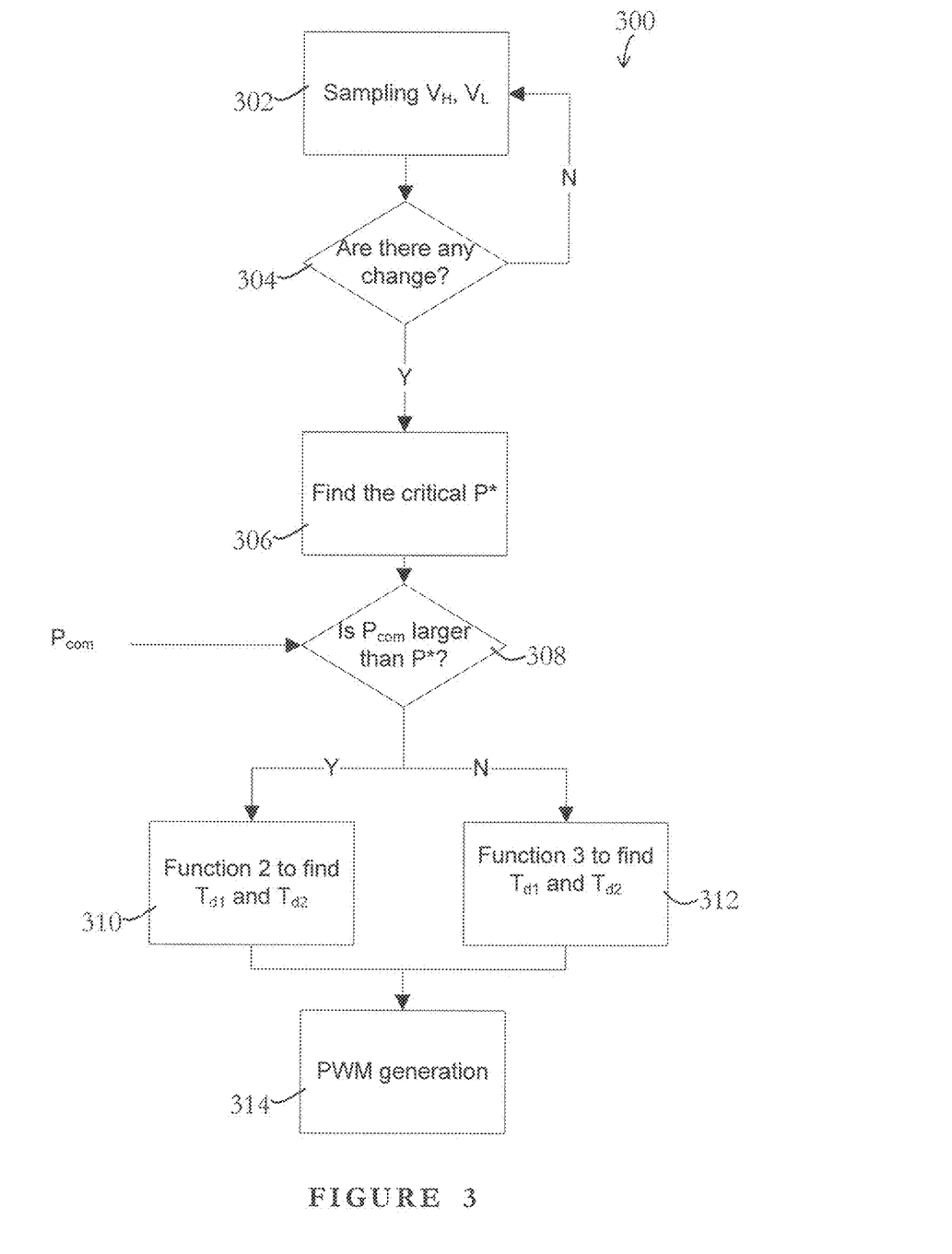
FIG. 3 is a flow diagram showing a control method operable by a controller in the converter circuit of FIG. 2 in accordance with one embodiment of the present invention.

FIG. 3 shows a control method 300 operable by a controller 206 in the converter circuit 200 of FIG. 2 in accordance with one embodiment of the present invention. In one embodiment, different steps in the method of FIG. 3 are carried out solely in the controller 206. However, a person skilled in the art would appreciate that the method can be implemented in one or more processors associated with the converted circuit 200. In other words, different steps may be performed by different processors or controllers.

Preferably, the controller 206 carrying out method 300 is arranged to control the switches $s_{1u}$, $s_{1d}$, $s_{2u}$, $s_{2d}$, $s_{3u}$, $s_{3d}$, $s_{4u}$, $s_{4d}$ such that they have a substantially identical switching period $T_p$. The controller also switches on and off each of the first pair of switches SA1, the second pair of switches SA2, the third pair of switches SA3 and the fourth pair of switches SA4 complementarily such that the switches $s_{1u}$, $s_{1d}$, $s_{2u}$, $s_{2d}$, $s_{3u}$, $s_{3d}$, $s_{4u}$, $s_{4d}$ each has a respective duty cycle of about 50% with a dead time therebetween. The controller 206 also switches on and off one of the sixth switch $s_{3d}$ and the seventh switch $s_{4u}$ synchronously, and switches on and off the fifth switch $s_{3u}$ and the eighth switch $s_{4d}$ synchronously. The controller 206 in the present embodiment determines a first duration $T_{d1}$ between a switch-on time of the fourth switch $s_{2d}$ and a switch-on time of the first switch $s_{1u}$; and a second duration $T_{d2}$ between the switch-on time of the first switch $s_{1u}$ and a switch-on time of the seventh switch $s_{4u}$, based on one or more predetermined equations or relationships.

Method 300 begins in step 302, in which the voltage levels of the first and second voltage sources $V_H$ and $V_L$ are detected. The instantaneous voltage levels of the first and second voltage sources $V_H$ and $V_L$ may be sampled at regular or random time intervals, or may be monitored continuously, using one or more voltage sensors 208 connected with the controller 206. In step 304, if it is detected that there is change in either or both of the voltage levels, the method proceeds to step 306, in which a power value, so called critical power P*, is calculated. In the present embodiment, the power value is calculated according to:

$$P^* = P_{max} \cdot \frac{V_L^2}{\sqrt{V_L^4 - V_{Lmax}^4 + V_{Lmax}^2 V_{Hmin}^2}}$$

where P* is the power value to be calculated, $P_{max}$ is an upper limit of the power value, $V_L$ is the detected second voltage level, $V_{Lmax}$ is an upper limit of the second voltage level, and $V_{Hmin}$ is a lower limit of the first voltage level. Preferably, $P_{max}$, $V_{Lmax}$ and $V_{Hmin}$ are predetermined. On the other hand, if it is detected that there is no change in any of the voltage levels, the method returns back to step 302.

After calculating the power value in step 306, the calculated power value P* is compared with a reference power value $P_{com}$ in step 308. The reference power value $P_{com}$ may be predetermined (e.g., stored in the controller 206 or retrieved by the controller 026 from other sources), or may be dynamically adjustable (e.g., inputted by a control personnel operating the controller 206). In the latter case, the controller 206 receives the reference power value $P_{com}$ before step 308.

In step 308, if it is determined that the calculated power value P* is smaller than the reference power value $P_{com}$, then in step 310 the controller 206 would apply the following equations to calculate the first duration $T_{d1}$ between a switch-on time of the fourth switch $s_{2d}$ and a switch-on time of the first switch $s_{1u}$, and the second duration $T_{d2}$ between the switch-on time of the first switch $s_{1u}$ and a switch-on time of the seventh switch $s_{4u}$:

$$T_{d1} = \frac{1}{\pi} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2} T_p \cos^{-1}\left[\frac{V_L^2}{\sqrt{V_L^4 - V_{Lmax}^4 + V_{Lmax}^2 V_{Hmin}^2}}\right] -$$

$$\frac{\pi}{2} T_p \cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

where $T_{d1}$ is the first duration, $T_{d2}$ is the second duration, $T_p$ is the switching period of the switches, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level. $T_p$, $P_{max}$, $V_{Lmax}$ and/or $V_{Hmin}$ may be predetermined.

On the other hand, if it is determined that the calculated power value is larger than the reference power value, then in step 312 the controller would apply the following equations to calculate the first duration and the second duration:

$$T_{d1} = \frac{1}{\pi} T_p \cos^{-1}\left[\frac{V_L}{V_H}\right]$$

$$T_{d2} = \frac{\pi}{2} T_p \sin^{-1}\left[\frac{P_{com} V_{Lmax}\left(\sqrt{V_{Hmin}^2 - V_{Lmax}^2}\right)}{P_{max}} \cdot V_L^2\right] - \frac{\pi}{2} T_p \cos^{-1}\left[\frac{V_L}{V_H}\right]$$

where $T_{d1}$ is the first duration, $T_{d2}$ is the second duration, $T_p$ is the switching period of the switches, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level. $T_p$, $P_{max}$, $V_{Lmax}$ and/or $V_{Hmin}$ is preferably predetermined.

In any case, after the first and second duration $T_{d1}$ and $T_{d2}$ are calculated in step 310 or 312, the controller 206 would then generate gating signals, e.g., in the form of PWM signals, to be provided to the one or more switches $s_{1u}$, $s_{1d}$, $s_{2u}$, $s_{2d}$, $s_{3u}$, $s_{3d}$, $s_{4u}$, $s_{4d}$ based on the determined switching time, in step 314. In one example, the controller includes a PWM unit for generating gating signals. Subsequently, the controller 206 may provide the gating signals to control the operation of the switches $s_{1u}$, $s_{1d}$, $s_{2u}$, $s_{2d}$, $s_{3u}$, $s_{3d}$, $s_{4u}$, $s_{4d}$ and hence the converter circuit 200.

Figure 4:
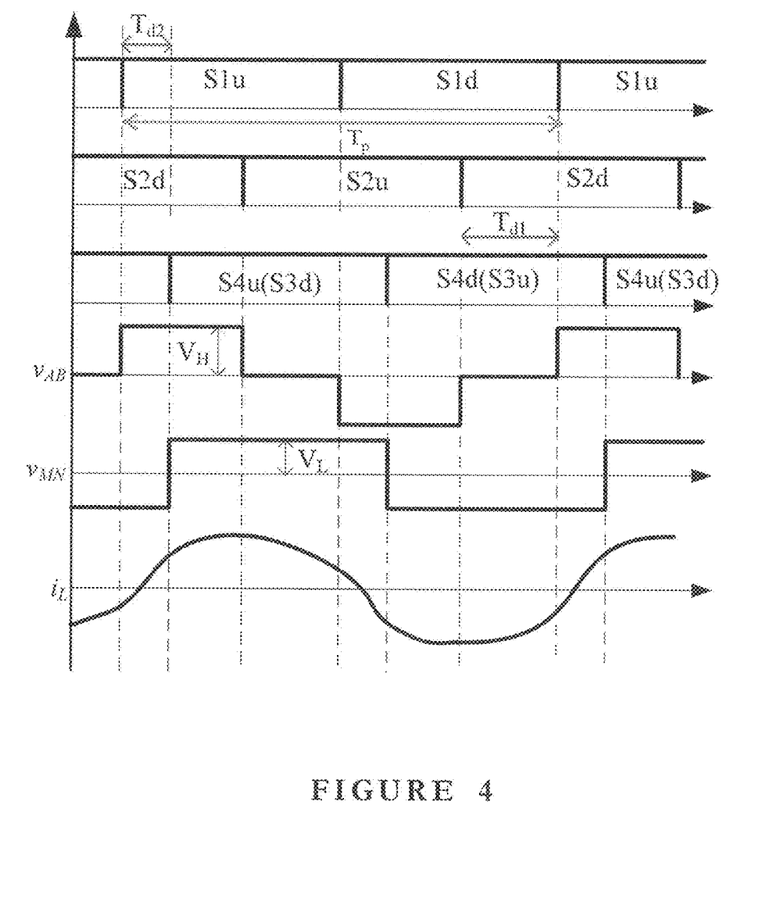
FIG. 4 is a graph showing steady state waveforms of the converter circuit of FIG. 2 when controlled using the control method of FIG. 3.

FIG. 4 shows steady state waveforms of the converter circuit of FIG. 2 when controlled using the control method of FIG. 3. As shown in FIG. 4, all switches $s_{1u}$, $s_{1d}$, $s_{2u}$, $s_{2d}$, $s_{3u}$, $s_{3d}$, $s_{4u}$, $s_{4d}$ have the same switching period $T_p$, defined as a duration between successive switch-on times of the first switch $S_{1u}$. Also, each of the first pair of switches SA1, the second pair of switches SA2, the third pair of switches SA3, and the fourth pair of switches SA4 are switched on and off complementarily. The fifth and eight switches $s_{3u}$ and $s_{4d}$ are switched on and off synchronously, and so are the sixth and seventh switches $s_{3d}$ and $s_{4u}$. In FIG. 4, the first duration $T_{d1}$ between a switch-on time of the fourth switch $s_{2d}$ and a switch-on time of the first switch $s_{1u}$ is positive, between 0 and $T_p/2$. The second duration $T_{d2}$ between the switch-on time of the first switch $s_{1u}$ and a switch-on time of the seventh switch $s_{4u}$ is positive. The potential difference between the third node N and the fourth node M of the second switching circuit 204 is in phase with the transformer current $i_L$.

A person skilled in the art would appreciate that the converter circuit 200 of FIG. 2 may be modified to have other constructions. For example, the switches $s_{1u}$, $s_{1d}$, $s_{2u}$, $s_{2d}$, $s_{3u}$, $s_{3d}$, $s_{4u}$, $s_{4d}$ in the circuit 200 may be replaced with other types of semiconductor switches, transistors, or other components that can be controlled by one or more controllers. On the other hand, the method 300 of FIG. 3 may be implemented on other converter circuits not specifically illustrated in the drawings. The method 300 of FIG. 3 may be implemented on one or more computing systems, integrated or distributed, with one or more hardware and software modules. The circuit and method in the present invention are each useful on its own in different applications, and their application should not limited to use in renewable energy systems, such as the one shown in FIG. 1.

Embodiments of the dual-bridge resonant dc/dc converter in the present invention are particularly adapted for medium to high power applications, and can provide high efficiency, high power density and flexible control strategy. Embodiments of the control method in the present invention are easy to implement and are capable of handling bidirectional power flow in the dual-bridge resonant converter efficiently. Also, the control method can maintain high efficient operation when both voltages level and power level varies in a wide range. With the proposed control method, the switches $s_{1u}$, $s_{1d}$, $s_{2u}$, $s_{2d}$, $s_{3u}$, $s_{3d}$, $s_{4u}$, $s_{4d}$ can be turned on with zero voltage and can be turned off softly, i.e., the voltages and currents of these switches would not be changed abruptly during turn-on and turn-off transient. The soft switching of these switches can reduce the switching loss in the circuit, and this in turn allows the circuit to operable with higher frequencies. The advantage of high frequency operation is that the size of the inductor, the capacitor, the transformer or other circuit components can be substantially reduced.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for controlling an operation of a converter circuit adapted to regulate power transfer between a first voltage source and a second voltage source, the method comprising the steps of:
    detecting a first voltage level of the first voltage source and a second voltage level of the second voltage source;
    calculating a power value based on the detected first voltage level and the detected second voltage level;
    comparing the calculated power value with a reference power value; and
    determining switching time of one or more switches in the converter circuit based on a compared result so as to regulate power transfer between the first voltage source and the second voltage source;
    wherein the power value is calculated according to:

$$P^* = P_{max} \cdot \frac{V_L^2}{\sqrt{V_L^4 - V_{Lmax}^4 + V_{Lmax}^2 V_{Hmin}^2}}$$

where P* is the power value to be calculated, $P_{max}$ is an upper limit of the power value, $V_L$ is the detected second voltage level, $V_{Lmax}$ is an upper limit of the second voltage level, and $V_{Hmin}$ is a lower limit of the first voltage level.

2. The method in accordance with claim 1, further comprising the step of:
    generating gating signals to be provided to the one or more switches based on the determined switching time.

3. The method in accordance with claim 2, further comprising the step of:
    providing the gating signals to the one or more switches so as to control switching on and off thereof.

4. The method in accordance with claim 1, further comprising the step of: controlling the one or more switches to have a substantially identical switching period.

5. The method in accordance with claim 1, wherein the step of detecting the first voltage level and the second voltage level comprises:
    sampling the first voltage level; and
    sampling the second voltage level.

6. The method in accordance with claim 1, wherein the converter circuit comprises:
    a first switching circuit in the form of a bridge circuit, the first switching circuit having a first pair of switches and a second pair of switches connected in parallel with each other;
    a second switching circuit in the form of a bridge circuit, the second switching circuit having a third pair of switches and a fourth pair of switches connected in parallel with each other; and an inductive component coupling the first switching circuit with the second switching circuit;

and wherein the method comprises:

controlling the first pair of switches, the second pair of switches, the third pair of switches, the fourth pair of switches so that they all have a substantially identical switching period.

7. The method in accordance with claim 6, wherein the step of determining switching time comprises:

determining a first duration from a switch-on time of one of the second pair of switches to a switch-on time of one of the first pair of switches; and determining a second duration between the switch-on time of the one of the first pair of switches and a switch-on time of one of the fourth pair of switches.

8. The method in accordance with claim 7, wherein if the calculated power value is smaller than the reference power value, the first duration and the second duration are determined by:

$$T_{d1} = \frac{1}{\pi}T_P\cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2}T_P\cos^{-1}\left[\frac{V_L^2}{\sqrt{V_L^4 - V_{Lmax}^4 + V_{Lmax}^2 V_{Hmin}^2}}\right] -$$

$$\frac{\pi}{2}T_P\cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

9. The method in accordance with claim 7, wherein if the calculated power value is larger than the reference power value, the first duration and the second duration are determined by:

$$T_{d1} = \frac{1}{\pi}T_P\cos^{-1}\left[\frac{V_L}{V_H}\right]$$

$$T_{d2} = \frac{\pi}{2}T_P\sin^{-1}\left[\frac{P_{com}V_{Lmax}\left(\sqrt{V_{Hmin}^2 - V_{Lmax}^2}\right)}{P_{max}} \cdot V_L^2\right] - \frac{\pi}{2}T_P\cos^{-1}\left[\frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

10. The method in accordance with claim 1, wherein the reference power value is predetermined.

11. The method in accordance with claim 1, wherein the converter circuit is controlled so as to regulate bi-directional power flow between the first voltage source and the second voltage source.

12. A controller arranged to control an operation of a converter circuit adapted to regulate power transfer between a first voltage source and a second voltage source, the controller being arranged to:

detect a first voltage level of the first voltage source and a second voltage level of the second voltage source;

calculate a power value based on the detected first voltage level and the detected second voltage level;

compare the calculated power value with a reference power value; and determine switching time of one or more switches in the converter circuit based on a compared result so as to regulate power transfer between the first voltage source and the second voltage source;

wherein the controller is arranged to calculate the power value according to:

$$P^* = P_{max} \cdot \frac{V_L^2}{\sqrt{V_L^4 - V_{Lmax}^4 + V_{Lmax}^2 V_{Hmin}^2}}$$

where $P^*$ is the power value to be calculated, $P_{max}$ is an upper limit of the power value, $V_L$ is the detected second voltage level, $V_{Lmax}$ is an upper limit of the second voltage level and $V_{Hmin}$ is a lower limit of the first voltage level.

13. The controller in accordance with claim 12, wherein the converter circuit comprises:

a first switching circuit in the form of a bridge circuit, the first switching circuit having a first pair of switches and a second pair of switches connected in parallel with each other;

a second switching circuit in the form of a bridge circuit, the second switching circuit having a third pair of switches and a fourth pair of switches connected in parallel with each other; and an inductive component coupling the first switching circuit with the second switching circuit; and wherein the controller is arranged to control the first pair of switches, the second pair of switches, the third pair of switches, and the fourth pair of switches so that they all have a substantially identical switching period.

14. The controller in accordance with claim 13, wherein the switching time determined by the controller comprises:

a first duration from a switch-on time of one of the second pair of switches to a switch-on time of one of the first pair of switches; and a second duration between the switch-on time of the one of the first pair of switches and a switch-on time of one of the fourth pair of switches.

15. The controller in accordance with claim 14, wherein if the calculated power value is smaller than the reference power value, the controller is arranged to determine the first duration and the second duration by:

$$T_{d1} = \frac{1}{\pi}T_P\cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

$$T_{d2} = \frac{\pi}{2}T_P\cos^{-1}\left[\frac{V_L^2}{\sqrt{V_L^4 - V_{Lmax}^4 + V_{Lmax}^2 V_{Hmin}^2}}\right] -$$

$$\frac{\pi}{2}T_P\cos^{-1}\left[\frac{P_{com}\left(\sqrt{V_L^4 - V_{Lmax}^4 + V_{Lmax}^2 V_{Hmin}^2}\right)}{P_{max}} \cdot \frac{V_L}{V_H}\right]$$

and wherein if the calculated power value is larger than the reference power value, the controller is arranged to determine the first duration and the second duration by:

$$T_{d1} = \frac{1}{\pi}T_p\cos^{-1}\left[\frac{V_L}{V_H}\right]$$

$$T_{d2} = \frac{\pi}{2}T_p\sin^{-1}\left[\frac{P_{com}V_{Lmax}\left(\sqrt{V_{Hmin}^2 - V_{Lmax}^2}\right)}{P_{max}} \cdot V_L^2\right] - \frac{\pi}{2}T_p\cos^{-1}\left[\frac{V_L}{V_H}\right]$$

where $T_{d1}$ is the first duration, $T_{d2}$ is the second duration, $T_p$ is the switching period, $P_{max}$ is an upper limit of the power value, $P_{com}$ is the reference power value, $V_L$ is the detected second voltage level, $V_{Lmax}$ is an upper limit of the second voltage level, $V_H$ is the detected first voltage level, and $V_{Hmin}$ is a lower limit of the first voltage level.

16. The controller in accordance with claim 15, wherein the controller is further arranged to perform one or more of the following:

switch on and off the first pair of switches complementarily such that each of the first pair of switches has a duty cycle of about 50% with a dead time therebetween;

switch on and off the second pair of switches complementarily such that each of the second pair of switches has a duty cycle of about 50% with a dead time therebetween;

switch on and off the third pair of switches complementarily such that each of the third pair of switches has a duty cycle of about 50% with a dead time therebetween;

switch on and off the fourth pair of switches complementarily such that each of the fourth pair of switches has a duty cycle of about 50% with a dead time therebetween; switch on and off one of the third pair of switches and one of the fourth pair of switches synchronously; and switch on and off another one of the third pair of switches and another one of the fourth pair of switches synchronously.

17. A method for controlling an operation of a converter circuit adapted to regulate power transfer between a first voltage source and a second voltage source, the method comprising the steps of:

detecting a first voltage level of the first voltage source and a second voltage level of the second voltage source;

calculating a power value based on the detected first voltage level and the detected second voltage level;

comparing the calculated power value with a dynamically adjustable reference power value; and determining switching time of one or more switches in the converter circuit based on a compared result so as to regulate power transfer between the first voltage source and the second voltage source;

wherein the method further comprises the step of:

receiving the dynamically adjustable reference power value before the step of comparing the calculated power value with the dynamically adjustable reference power value.

18. A method for controlling an operation of a converter circuit adapted to regulate power transfer between a first voltage source and a second voltage source, the converter circuit comprising a first switching circuit in the form of a bridge circuit, the first switching circuit having a first pair of switches and a second pair of switches connected in parallel with each other; a second switching circuit in the form of a bridge circuit, the second switching circuit having a third pair of switches and a fourth pair of switches connected in parallel with each other; and an inductive component coupling the first switching circuit with the second switching circuit;

the method comprising the steps of:

detecting a first voltage level of the first voltage source and a second voltage level of the second voltage source;

calculating a power value based on the detected first voltage level and the detected second voltage level;

comparing the calculated power value with a reference power value;

determining switching time of one or more switches in the converter circuit based on a compared result so as to regulate power transfer between the first voltage source and the second voltage source; and controlling the first pair of switches, the second pair of switches, the third pair of switches, the fourth pair of switches so that they all have a substantially identical switching period;

wherein the method further comprises one or more of the following steps:

switching on and off the first pair of switches complementarily such that each of the first pair of switches has a duty cycle of about 50% with a dead time therebetween;

switching on and off the second pair of switches complementarily such that each of the second pair of switches has a duty cycle of about 50% with a dead time therebetween;

switching on and off the third pair of switches complementarily such that each of the third pair of switches has a duty cycle of about 50% with a dead time therebetween;

switching on and off the fourth pair of switches complementarily such that each of the fourth pair of switches has a duty cycle of about 50% with a dead time therebetween;

switching on and off one of the third pair of switches and one of the fourth pair of switches synchronously; and switching on and off another one of the third pair of switches and another one of the fourth pair of switches synchronously.

* * * * *